United States Patent [19]

Becker

[11] Patent Number: 5,444,907

[45] Date of Patent: Aug. 29, 1995

[54] DEVICE TO PULL ELECTRIC METER

[76] Inventor: John Becker, 218 SW. 13th St., Cape Coral, Fla. 33991

[21] Appl. No.: 165,169

[22] Filed: Dec. 13, 1993

[51] Int. Cl.$^6$ ............................................. B23P 19/04
[52] U.S. Cl. ....................................... 29/764; 29/278; 29/758; 81/3.43
[58] Field of Search ............... 29/270, 278, 279, 426.5, 29/762, 764, 758, 253, 283; 81/3.43, 3.44

[56] References Cited

U.S. PATENT DOCUMENTS

| | | | |
|---|---|---|---|
| 1,898,409 | 2/1933 | Underwood | 81/3.43 |
| 2,481,055 | 9/1949 | Whitaker | 81/3.43 |
| 2,771,802 | 11/1956 | Lewis | 81/3.43 |
| 3,044,158 | 7/1962 | Bushnell | 29/278 |
| 3,103,836 | 9/1963 | Bristol, III | 29/278 X |
| 4,122,599 | 10/1978 | Lunycz | 29/764 X |
| 5,097,581 | 3/1992 | Williams et al. | 29/278 |

FOREIGN PATENT DOCUMENTS

| | | | |
|---|---|---|---|
| 2410625 | 8/1979 | France | 81/3.43 |
| 2730 | of 1909 | United Kingdom | 29/278 |

*Primary Examiner*—Peter Dungba Vo

[57] ABSTRACT

A device to provide a quick and safe elimination of the supply of electricity to a building. The device attaches to the protective housing of the electric meter and permits the user to remain at a safe distance while further providing leverage to be applied to the meter to facilitate removal. If arcing of the electricity flowing through the meter occurs, the operator is safe from it harmful effects. It being recognized that during fire-fighting operations water is being applied in vast quantities and the dangers of arcing are significantly increased when water is present. The elimination of the supply of electricity to a building on fire is necessary to ensure the safety of the firefighters and other emergency personnel. The device is simple to apply and is applicable to all known types and sizes of meters. The extensive use of nonconductive materials, in the design of the device, ensure the safety of the user. Once the housing cover is opened or removed the device is secured to the protective cover of the meter by encircling the cover with a strap or band. A wedge shaped, or raised section, is provided to ensure a secure attachment to the protective cover, which generally tapers slightly inward toward the exposed end. Upward or downward pressure is then applied to the opposing end from attachment, the meter is pivoted, the connections disengage, the meter is removed from its housing, and the flow of electricity is terminated, while the operator remains at a safe distance.

10 Claims, 4 Drawing Sheets

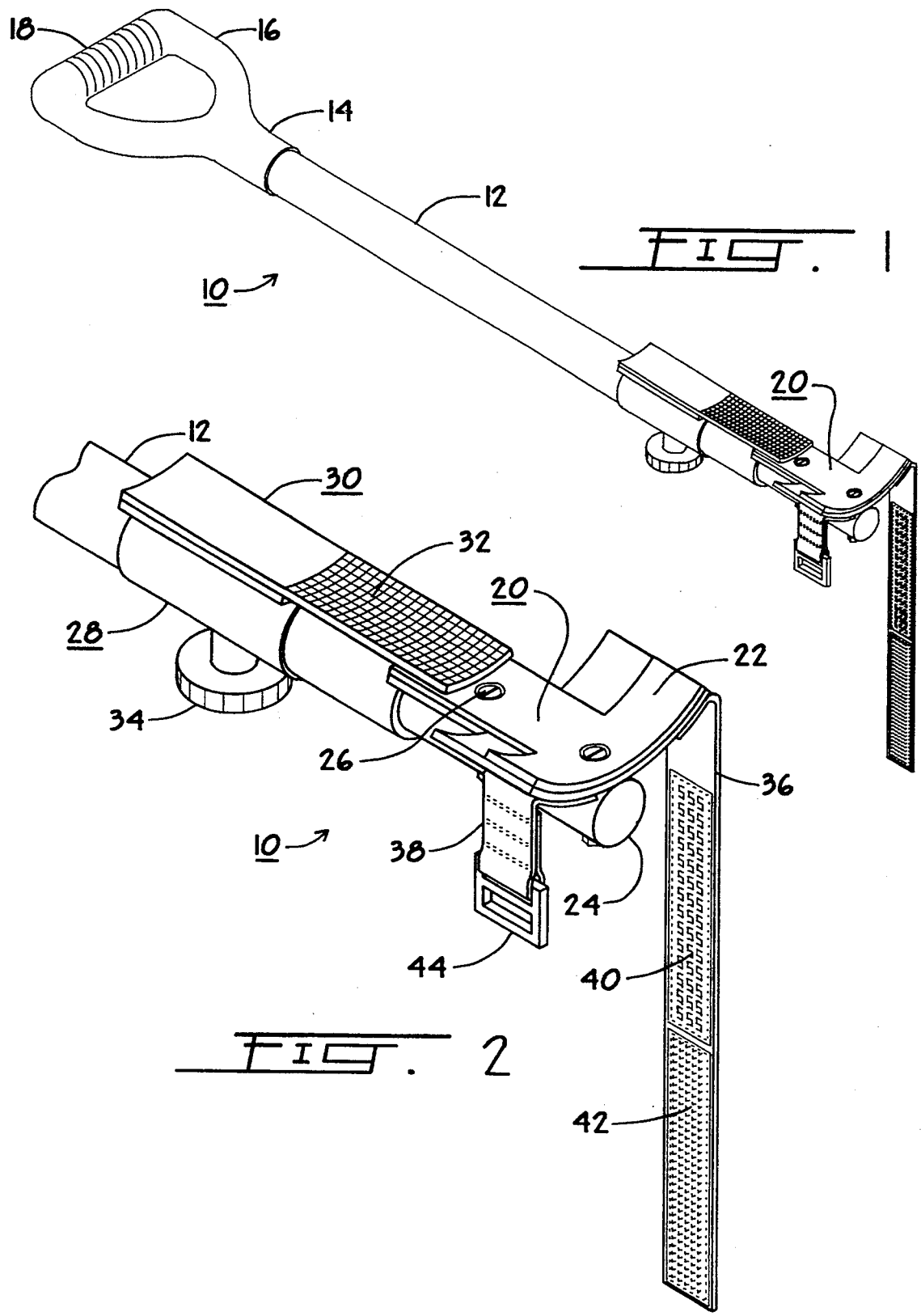

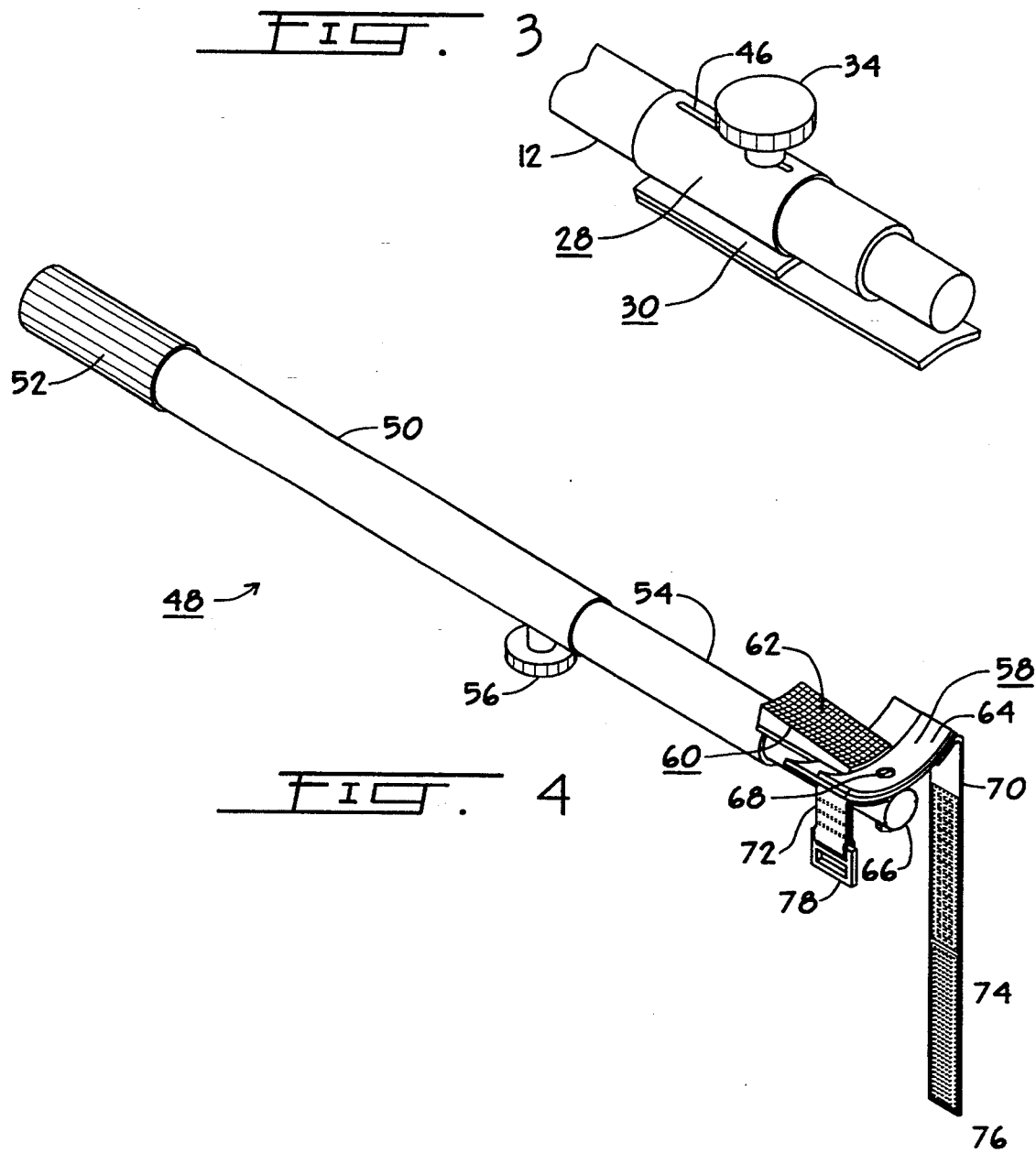

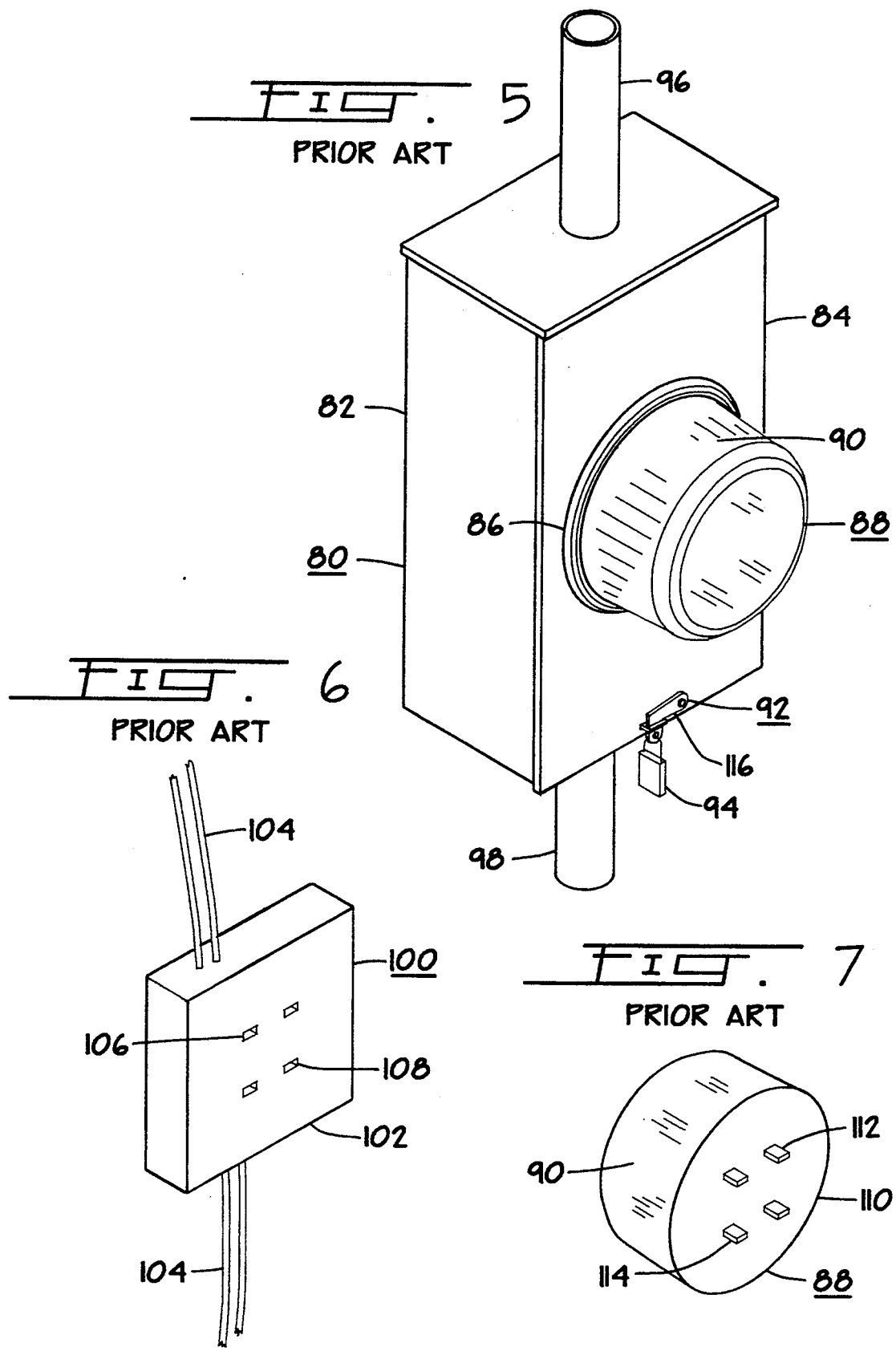

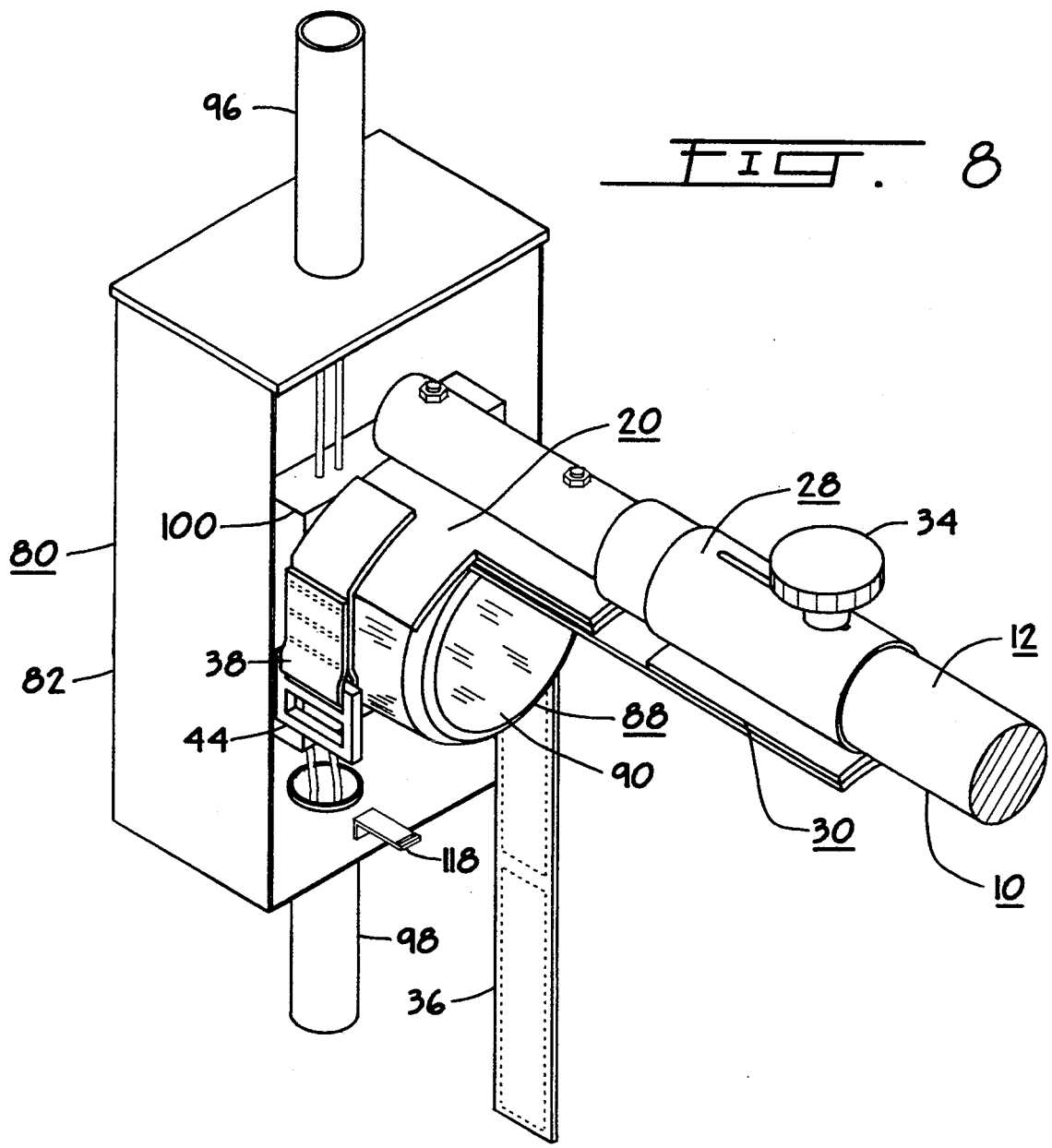

DEVICE TO PULL ELECTRIC METER

BACKGROUND OF THE INVENTION

1. Field of the Invention

This invention relates to a tool for the removal of electric power meters of various diameters and lengths, from their housings, without concern for the presence of a flow of electricity though the meter. Primarily this removal would be performed by emergency personnel, such as firefighters, to ensure elimination of electricity to a building. It being understood that such emergency elimination of electricity to a building on fire is generally performed as quickly as possible during firefighting operations. It further being understood that the application of water to the building on fire is often being provided by other firefighters, increasing the danger of electrocution to the personnel performing the meter pulling procedure.

2. Brief Description of the Prior Art

Electric meters are removed and replaced by personnel employed by electric companies on a regular basis for a variety of reasons. Generally electric meters have a transparent protective cover, most commonly constructed of glass. While various sizes are used, the exposed area of an installed meter generally is of a tubular design with a slight tapering toward the exposed end.

Emergency personnel, particularly firefighters, often must enter buildings which are on fire to perform rescue operations and to effectively fight the fire. Often the firefighters will cut into walls and pull ceilings down to provide access to efficiently fight the fire. It being understood that electric lines are present within walls and ceilings and that during such operations, massive quantities of water are being distributed to suffocate the fire. During such firefighting operations the emergency personnel must quickly and completely terminate the supply of electricity to the building on fire. This is facilitated by the removal of the electric meter, or meters, from their respective housings, which supply that particular building. All commercial electricity passes through a metering device to allow for an accurate measurement of consumption. These metering units generally are securely attached to an exposed wall of the building itself.

In the art we find one pertinent prior Patent, being U.S. Pat. No. 5,097,581 issued Mar. 24, 1992 to Williams and Brockett. This patent teaches the use of a housing, having vents for the discharge of gasses, which attaches to the meter utilizing clasps and having a grip attached to the opposing end which permits pressure to be applied to facilitate installation or removal of a meter. While this invention provides a usable device it has several deficiencies which make it less efficient than desired. One concern is the necessity of providing a variety of sizes to permit use with meters of varying diameters and lengths. Another concern rests with the attachment method which requires a plurality of spaced attachments around the base of the meter. If one or more of these attachments fail, the operation must be suspended and reattachment attempted. A further limitation lies with the stationary distance of the gripping apparatus from the base of the meter. With this configuration adjustment cannot be made to provide for increased leverage of the device. Finally, the danger of arcing of electricity during the emergency removal of a meter, where a flow of electricity through the meter exists, is not addressed.

Your applicant is unaware of any device which currently addresses the danger of electrocution from arcing faced by the firefighters during the emergency operation of removing a meter to terminate the supply of electricity to a building.

OBJECTS AND ADVANTAGES OF THE INVENTION

The primary object of the invention is to provide emergency personnel with a device which will permit them to quickly eliminate the supply of electricity to a building, by safely removing the electric meter from its housing. Further advantages include;

a) to provide for a secure attachment of the device to the protective cover of the meter to prevent slippage of the removal device during the removal operation.

b) to provide for a wedging feature, incorporated into the design of the device, to ensure a secure attachment of the removal device to the protective cover of the meter, which generally has a tapered design narrowing slightly toward its exposed end.

c) to provide for a safe operating distance between the meter and the emergency personnel performing the removal operation to eliminate the dangers of arcing of the electricity. It being understood that the danger of arcing is significantly increased when water is present, such as during firefighting operations.

d) to provide for the majority of the device to be constructed of a nonconductive material such as plastic, fiberglass or wood.

e) to provide for the optional adjustment of the length of the device to provide variable leverage during use.

f) to provide for the optional adjustment of the length of the device to provide for ease of storage and transport.

g) to provide for a slightly compressible material, such as rubber, on the removal device at the point of contact with the protective cover, generally constructed of glass, of the meter, to prevent slippage of the device during use.

h) to optionally provide a slightly flexible attachment member, which would conform to the diameter of the individual meter's protective cover during use.

i) to provide a device capable of being utilized by the operator, wearing proper safety equipment such as insulated gloves, to safely remove a meter with a cracked or broken protective cover.

Other objects, advantages and features of the present invention will become apparent to those skilled in the art from the detailed description which follows. It should be understood, however, that the detailed description and specific examples, while indicating preferred embodiment, are given as examples and not limitations. Many changes and modifications to the invention are possible without departing from the spirit of the invention, and all such modifications are included. Thus the scope of the invention should be determined by the appended claims rather than the specific embodiments shown.

BRIEF DESCRIPTION OF THE DRAWINGS

FIG. 1 is a perspective view of a meter removal device.

FIG. 2 is a perspective view of the enlarged connection end of the meter removal device illustrated in FIG. 1.

FIG. 3 is an opposing perspective view of the slide assembly as illustrated in FIG. 1 and FIG. 2.

FIG. 4 is a perspective view of an alternate embodiment of a meter removal device.

FIG. 5 is a perspective view of a prior art meter box.

FIG. 6 is a perspective view of a prior art meter connection housing.

FIG. 7 is a perspective view of a prior art electric meter.

FIG. 8 is a perspective view of a meter removal device resting on, and awaiting attachment to, an electric meter, contained within a meter box.

| REFERENCE NUMERALS IN DRAWINGS |
|---|
| 10. Meter removal device |
| 12. Staff |
| 14. Connection |
| 16. Handle |
| 18. Grip |
| 20. Meter engagement member |
| 22. Contact surface |
| 24. Extension member |
| 26. Securing assembly |
| 28. Slide assembly |
| 30. Wedge assembly |
| 32. Textured surface |
| 34. Securing knob |
| 36. First strap |
| 38. Second strap |
| 40. First hook and loop member |
| 42. Second hook and loop member |
| 44. Buckle |
| 46. Elongated track |
| 48. Meter removal device |
| 50. Primary staff |
| 52. Handle |
| 54. Extension staff |
| 56. Extension securing knob |
| 58. Engagement member |
| 60. Wedge assembly |
| 62. Textured surface |
| 64. Contact surface |
| 66. Extension member |
| 68. Securing assembly |
| 70. First strap |
| 72. Second strap |
| 74. First hook and loop member |
| 76. Second hook and loop member |
| 78. Buckle |
| 80. Meter box |
| 82. Main housing |
| 84. Cover |
| 86. Encircling rim |
| 88. Electric meter |
| 90. Protective transparent housing |
| 92. Locking mechanism |
| 94. Security tab |
| 96. First protective conduit |
| 98. Second protective conduit |
| 100. Meter connection housing |
| 102. Housing face |
| 104. Electric wire |
| 106. Upper connector receptacle |
| 108. Lower connector receptacle |
| 110. Meter back |
| 112. Upper connector |
| 114. Lower connector |
| 116. First locking mechanism |
| 118. Second locking mechanism |

SUMMARY OF THE INVENTION

A device to quickly and safely remove a electric meter from its housing, so as to ensure the elimination of electricity to a building, during emergency situations, such as during a fire. It being recognized that emergency personnel would have access to, and would be utilizing, proper safety equipment, such as insulated gloves, during use of the device. The device is primarily comprised of non conductive materials which significantly reduce the danger of the operator being electrocuted during use. The device provides for a speedy and secure attachment of the device to the meter under widely varying conditions which may exist during a fire. The device allows the operator to remain at a relative distance to the meter during the moment of removal. It is during this moment of removal that the emergency personnel are most at risk from arcing of the electricity. This is particular true in commercial operations were relatively large quantities of electricity are traveling through the meter. The device provides for the secure attachment to the protective covering of the meter, which is generally a glass cover. This securing is facilitated by employing a slightly compressible material at the point of contact, such as rubber, and straps to tightly encircle the protective cover. Once attached downward pressure is applied to the opposing end of the device, from the connection end, and the meter pivots away from its housing, and is removed.

DESCRIPTION OF THE PREFERRED EMBODIMENT

Referring now to the drawings where like reference numerals refer to like parts throughout the various views. FIG. 1 is a perspective view of the bottom of a meter removal device, 10, formed by a staff 12, constructed of a non conductive material such as fiberglass, plastic or wood, a handle 16, similarly constructed of a non conductive material as staff 12, and a meter engagement member 20. Handle 16 is securely attached to staff 12 by a connection 14. A grip 18 is provided as part of handle 16 to permit the operator to hold meter removal device 10 with the optional secondary point of gripping being staff 12.

FIG. 2 is a perspective view of an enlarged cutaway section of the bottom of a meter removal device 10 as illustrated in FIG. 1. Attached to, and slideable, on staff 12, is a wedge assembly 30 formed by a slide assembly 28 which is moveable on, and relative to, staff 12. Slide assembly 28 is capable of being secured, to a desired location on staff 12, by engaging a securing knob 34. A textured surface 32 is provided on wedge assembly 30 to permit a relatively nonslip engagement to the protective cover, generally constructed of glass, of the electric meter. It being understood that wedge assembly 30 is designed to allow a secure attachment of meter removal device 10 by providing a secondary contact surface, or elevated section, and thus permitting compensation for the tapered design of most protective covers used on electric meters. Meter engagement member 20, constructed of a slightly flexible material, is shown securely attached to an extension member 24, utilizing securing assembly 26. Extension member 24 is securely attached to staff 12. Securely attached to meter engagement member 20, on opposing lateral sides, are a first strap 36 and a second strap 38. First strap 36 and second strap 38 are flexible belt members constructed of a suitable material such as a fabric, nylon or leather. Attached to first strap 36 are a first hook and loop member 40 and a second hook and loop member 42. Second strap 38 has securely attached a buckle 44. Meter engagement member 20 further has a contact surface 22 which will be in partial contact with the protective cover of an electric meter during the removal operation. First strap 36 and second strap 38 would be place around the protective cover of the electric meter and secured by inserting first strap 36 through buckle 44 and pulling first strap 36 to tighten, then placing first hook and loop member 40 in contact with second hook and loop member 42.

FIG. 3 is a cutaway perspective view of an opposing view of wedge assembly 30 attached to staff 12 as illustrated in FIGS. 1 and 2. Shown is slide assembly 28 encircling staff 12 with wedge assembly 30 securely attached to slide assembly 28. Securing knob 34 passes through elongated track 46 and is securable to shaft 12. Securing knob 34 is disengaged to permit adjustment of wedge assembly 30 along elongated track 46, relative to staff 12, and engaged to secure wedge assembly 30 at a desired location relative to staff 12.

FIG. 4 is a perspective view of the bottom of an alternate embodiment of a meter removal device 48. A handle 52 is provided for secure gripping by the operator during use, which is securely attached to a primary staff 50, which is optionally gripable during use. Telescoping from primary staff 50 is an extension staff 54 which permits length adjustment of the meter removal device 48. Securing extension staff 54 relative to primary staff 50, at a desired position, is an extension securing knob 56. Attached to extension staff 54 is an extension member 66 which has attached thereto an engagement member 58 utilizing a securing assembly 68. Attached to engagement member 58 is a wedge assembly 60 having a textured surface 62. It being understood the wedge assembly 60 is designed to compensate for the tapered design of most protective covers on electric meters. Textured surface 62, which will be partially in contact with the protective cover of the electric meter, has the purpose of preventing slippage during use. Attached to engagement member 58 is a contact surface 64, which will be in partial contact with the protective cover of the electric meter, and has the purpose of preventing slippage during use. Attached to opposing lateral sides of engagement member 58 are a first strap 70 and a second strap 72. First strap 70, constructed of a flexible material, has attached thereto a first hook and loop member 74 and a second hook and loop member 76. Second strap 72, constructed of a flexible material, has attached thereto a buckle 78. During use first strap 70 and second strap 72 are placed around and encircle the protective cover of the electric meter, first strap 70 is inserted through buckle 78, first strap 70 is pulled to tighten relative to the protective transparent cover, then first hook and loop member 74 is placed in contact with second hook and loop member 76 to secure meter removal device 48 to the protective cover of the electric meter.

FIG. 5 is a perspective view of a prior art meter box 80 having a main housing 82 and a cover 84. It being understood that the majority of electric meters are similarly constructed having a transparent protective cover housing the meter device, protruding from the face of the meter box. Main housing 82 has attached a first protective conduit 96 for incoming electric power lines and a second protective conduit 98 for outgoing electric power lines. Cover 84 has a encircling rim 86 and protruding outward through cover 84 is a protective transparent housing 90 forming a electric meter 88 and having internal mechanics for the measurement of electric consumption. Cover 84 is shown closed relative to main housing 82 and secured by a locking mechanism 92, partially comprised of a first locking mechanism 116, secured with a security tab 94 which acts to alert electric utility personnel of tampering. It being understood that protective transparent housing 90 is most often constructed of glass and generally has a tapered design which narrows slightly as it extends toward the exposed end. It being further understood that cover 84 is generally either hinged at its top, relative to main housing 82, or is completely removable from main housing 82. Additionally it is understood that protective transparent housing 90 is of a one piece construction and the various lines illustrated, both straight and circular, are representative of shade lines.

It being understood that a very fast and efficient method for terminating the supply of electricity passing through a particular meter is to remove the meter from its housing unit thus severing the bridge that exists between the incoming power lines and the outgoing power lines.

FIG. 6 is a perspective view of a prior art meter connection housing 100. It being understood that meter connection housing 100 is enclosed within the meter box 80 shown in FIG. 5. Meter connection housing 100 has connected thereto electric wire 104 which act to provide incoming power and outgoing power. A housing face 102 is provided with upper connector receptacles 106 and lower connector receptacles 108 penetrating thereon. It being understood that upper connector receptacles 106 are internally connected to the upper set of electric wires 104 and that lower connector receptacles 108 are internally connected to the lower set of electric wires 104. It further being understood that upper connector receptacles 106 are not internally connected to lower connector receptacles 108.

FIG. 7 is a perspective view of a prior art electric meter 88 having a protective transparent housing 90 and a meter back 110. Extending from meter back 110 are upper connectors 112 and lower connectors 114. It being understood that electric meter 88 is installed into meter connection housing 100, shown in FIG. 6, by inserting lower connectors 114 into lower connector receptacles 108, shown in figure 6, and inserting upper connectors 112 into upper connector receptacles 106, shown in FIG. 6. It being understood that each of the two illustrated upper connectors 112 are internally connected, within electric meter 88, to their respective corresponding lower connector 114 and that electricity is capable of moving from each of upper connectors 112 to their corresponding lower connector 114 while allowing a measurement of the power being consumed.

FIG. 8 is a perspective view of a meter removal device 10, illustrated in FIGS. 1, 2 and 3, properly placed on an electric meter 88, utilizing protective transparent housing 90, and ready to be secured for removal of electric meter 88. Shown is a meter box 80 having a main housing 82 with electric meter 88 protruding from meter box 80. It being understood that the cover, illustrated in FIG. 5 as 84, has been removed from meter box 80. Meter box 80 has attached, and penetrating meter box 80, a first protective conduit 96 and a second protective conduit 98. Secured within the confines of meter box 80 is a meter connection housing 100, as illustrated in FIG. 6, which has attached thereto electric meter 88. It being understood that while electric meter 88 is properly attached to meter connection housing 100 electricity can pass, in a monitored and measured manner, through meter box 80 for consumption by electric powered equipment. Attached to main housing 82 is a second locking mechanism 118 which cooperates with first locking mechanism 116, shown in FIG. 5, to secure cover 84, shown in FIG. 5, in its closed position relative to main housing 82. Meter removal device 10 has a staff 12 which has attached a meter engagement member 20 which is in contact with protective transparent housing 90. Protective transparent housing 90 is also in contact with wedge assembly 30 which is adjustable relative to staff 12 and protective transparent housing 90 utilizing slide assembly 28 and secured at a desired location utilizing securing knob 34. A first strap 36 and a second strap 38 are shown on opposing sides of protective transparent housing 90. Second strap 38 has attached a buckle 44. First strap 36 and second strap 38 are attached to meter removal device 10 as previously described for FIG. 2. Utilizing meter engagement member 20, wedge assembly 30, first strap 36 and second strap 38, electric meter 88 would be securely attached to meter removal device 10 by inserting first strap 36 through buckle 44 and securing as described for FIG. 2. After attachment downward pressure would be applied to the non connective end of meter removal device 10, electric meter 88 would be pivoted relative to meter connection housing 100 and electric meter 88 would be preyed away and be removed. It being understood that once electric meter 88 is removed from meter connection housing 100 the flow of electricity through meter box 80 is terminated. It being understood that the disclosed upper attachment is the preferred method of attachment, due to the ease of installation, but that attachment to the bottom of the electric meter is possible.

CONCLUSIONS AND RAMIFICATION OF THE INVENTION

While the device has been disclosed primarily for use by emergency personnel, use of the device by employees of power companies is envisioned and disclosed. Meters occasionally must be removed at time when access is not available to the power panel, generally situated within the building, where circuit breakers are located.

While a slidable member and a stationary wedge have been disclosed to compensate for the tapered design of the protective cover during attachment, other designs are envisioned and disclosed. A stationary member with a portion of the contact surface elevated is envisioned and disclosed. While a hook and loop securing means has been disclosed, many other conventional securing means are envisioned. While a flexible belt type strap has been disclosed, a flexible, yet substantially more rigid, encircling member is envisioned and disclosed. While a telescoping staff has been disclosed to vary the working length of the device, and to allow ease of storage, a folding staff is envisioned and disclosed.

Occasionally the emergency personnel performing a meter removal operation will encounter a cracked or broken protective cover. The danger of electrocution is enhanced during these occasions. With the present invention removal of a meter with a cracked cover can be attempted with the knowledge that should the protective cover become separated from the meter the protective cover can be removed from the device and the device applied directly to the then exposed mechanics of the meter. Due to the non conductive materials employed in the construction of the device, the dangers of electrocution, during this operation, are minimal. Similarly the operator, wearing suitable protective equipment, such as insulated gloves, could break away the remainder of a broken protective cover of a meter and initially attach the device to the then exposed mechanics of the meter and pivot the meter out of its housing as normally performed.

While only two general embodiments of the invention have been described, it will be understood that it is capable of still further modifications, and this application is intended to cover any variation, uses, or adaptations of the invention, following in general the principles of the invention and including such departures from the present disclosure as to come with the knowledge of customary practice in the art to which this invention pertains, and as may be applied to the essential features hereinbefore set forth and falling within the scope of the invention or the limits of the appended claims.

I claim:

1. A device for removing an electric power meter from a meter box, said electric power meter having a protective transparent cover, said device comprising;
   a) a single elongated staff having a first end and a second end and constructed of non conductive material;
   b) a meter engagement member, said meter engagement member attached to said first end of said staff, said meter engagement member having a contact surface, said contract surface constructed of a non conductive material;
   c) securing means extending laterally from said contact surface, said securing means to allow attachment of said contact surface of said meter engagement member, at said contact surface, to said protective transparent cover of said electric power meter;
   d) a grip, said grip formed by said second end of said staff, said grip providing leverage means to allow the operator to apply pivotal pressure to said device;
   whereby said contact surface of the device attaches to the protective cover of the electric meter, pivotal pressure is applied to the grip, a pivoting action occurs to the electric meter relative to the meter box to facilitate remove of the electric meter from the meter box.

2. The device defined in claim 1 further comprising a wedge assembly, said wedge assembly including a surface aspect elevated relative to said meter engagement member and forming a secondary contact surface for said transparent protective cover of said electric power meter whereby the wedge assembly and the meter engagement member contact the transparent protective cover of the electric meter following attachment.

3. The device defined in claim 2 further comprising wedge adjustment means, said wedge adjustment means comprising longitudinal movement of said wedge assembly relative to said staff and securing means to secure said wedge assembly relative to a desired position.

4. The device defined in claim 1 wherein said staff further comprises length adjustment means.

5. The device defined in claim 1 wherein said contact surface of said meter engagement member is comprised of a material having a predetermined compressible density.

6. The device defined in claim 1 wherein said meter engagement member is comprised of a material having a predetermined flexibility whereby the meter engagement member conforms to the transparent protective cover of the electric power meter following attachment.

7. The device defined in claim 1 wherein said securing means comprises a strap and a hook and loop fastener, said hook and loop fastener comprising a hook strip and a loop strip, said hook strip having a plurality of extending hook members, said loop strip having a plurality of extending closed loops, said hook strip attached to said strap, said loop strip attached to said strap.

8. The device defined in claim 1 wherein said non conductive material is a synthetic material.

9. The device defined in claim 1 wherein said non conductive material is wood.

10. A device for removing an electric power meter from a meter box, said electric power meter having a protective transparent cover, said device comprising;
 a) a single elongated staff having a first end and a second end and constructed of non conductive material;
 b) a meter engagement member, said meter engagement member attached to said first end of said staff, said meter engagement member having a contact surface, said contract surface constructed of a non conductive material;
 c) securing means extending laterally from said contact surface, said securing means to allow attachment of said contact surface of said meter engagement member, at said contact surface, to said protective transparent cover of said electric power meter;
 d) a grip, said grip formed by said second end of said staff, said grip providing leverage means to allow the operator to apply pivotal pressure to said device;
 e) a wedge assembly, said wedge assembly including a surface aspect elevated relative to said meter engagement member and forming a secondary contact surface for said transparent protective cover of said electric power meter;
 f) wedge adjustment means, said wedge adjustment means comprising longitudinal movement of said wedge assembly relative to said staff; g) securing means to secure said wedge assembly relative to a desired position.

* * * * *